(12) United States Patent
Matsuura

(10) Patent No.: US 8,259,768 B2
(45) Date of Patent: Sep. 4, 2012

(54) OPTICAL FIBER COMPONENT AND OPTICAL MODULE USING THE SAME

(75) Inventor: Hiroshi Matsuura, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 42 days.

(21) Appl. No.: 12/752,467

(22) Filed: Apr. 1, 2010

(65) Prior Publication Data
US 2010/0303102 A1 Dec. 2, 2010

(51) Int. Cl.
*H01S 5/00* (2006.01)
*G02B 6/38* (2006.01)

(52) U.S. Cl. .......................... 372/43.01; 385/70; 385/71

(58) Field of Classification Search ............. 372/6, 43.01; 385/70, 95–96
See application file for complete search history.

(56) References Cited

U.S. PATENT DOCUMENTS

| | | | | |
|---|---|---|---|---|
| 6,130,972 | A | * | 10/2000 | Shiraishi et al. ............... 385/33 |
| 6,236,783 | B1 | * | 5/2001 | Mononobe et al. ............. 385/43 |
| 6,424,765 | B1 | * | 7/2002 | Harker ........................... 385/31 |
| 2003/0165290 | A1 | * | 9/2003 | Bhagavatula et al. .......... 385/33 |
| 2005/0244101 | A1 | * | 11/2005 | Kitabayashi et al. ........... 385/33 |
| 2009/0092358 | A1 | | 4/2009 | Watanabe et al. |

FOREIGN PATENT DOCUMENTS

JP 2009-237374 10/2009

* cited by examiner

*Primary Examiner* — Jessica Stultz
*Assistant Examiner* — Phillip Nguyen
(74) *Attorney, Agent, or Firm* — Oblon, Spivak, McClelland, Maier & Neustadt, L.L.P.

(57) ABSTRACT

An optical fiber component comprises an optical fiber that transmits light; and a coreless fiber that is connected to the end surface of the optical fiber and prevents foreign matter from adhering to the end surface of the optical fiber. The optical fiber and the coreless fiber are connected by fusing one end surface of the coreless fiber to the end surface of the optical fiber. The core section on the end surface of the optical fiber is no longer exposed to the air. Moreover, the power density of light that is input at the core of the optical fiber is greatly reduced more than when there is no coreless fiber, so it is possible to prevent compounds of C, H and O from adhering to the core of the optical fiber.

8 Claims, 5 Drawing Sheets

US 8,259,768 B2

OPTICAL FIBER COMPONENT AND OPTICAL MODULE USING THE SAME

BACKGROUND OF THE INVENTION

1. Field of the Invention

The present invention relates to an optical fiber component that is used in SHG (Second Harmonic Generation) and THG (Third Harmonic Generation) optical sources that are used in laser microscopes, analysis equipment for biomedicine, precision measurement equipment and the like, and to an optical module that uses this optical fiber component.

2. Description of the Related Art

Conventionally, an optical module as illustrated in FIG. 8 has been known. This optical module comprises: a laser module 100 that generates and outputs laser light, for example, laser light having a wavelength of 375 μm to 650 μm; an input-side optical fiber 101 and an output-side optical fiber 102 that are connected to this laser module 100; a collimating system 103 that is located between the optical fibers 101, 102; and optical components that are located between two collimating lenses (condenser lenses) 104, 105 in the collimating system 103.

In the conventional optical module that is illustrated in FIG. 8, the end surface of the input-side optical fiber 101 and the end surface of the output-side optical fiber 102 are both exposed to the air, so compounds of C, H and O (foreign matter) that are included in extremely minute amounts in the air adhere to the end surfaces of the optical fibers 101, 102, and particularly the core surface that is continuously irradiated by high power density light. As a result, the intensity of light that propagates along the output-side optical fiber 102 drop enormously, and becomes impossible to use.

With this construction, it is possible to provide a long-life optical component and an optical module that uses this optical component that are capable of preventing compounds of C, H and O from adhering to the end surfaces of the optical fibers, and particularly the core section thereof, and are capable of maintaining the light propagation characteristics of the optical fiber over a long period of time.

SUMMARY OF THE INVENTION

It is an object of the present invention to at least partially solve the problems in the conventional technology.

The optical fiber component of one form of the present invention comprises an optical fiber that transmits light, and a coreless fiber that is connected to the end surface of the optical fiber and prevents foreign matter from adhering to the end surface of the optical fiber.

With the present invention, it is possible to suppress the adherence of compounds (foreign matter) of C, H and O from adhering to the end surface of the optical fiber, and particularly to the core section thereof, and thus it is possible to achieve a long-life optical fiber component that is capable of maintaining the light propagation characteristics of the optical fiber over a long period of time, and an optical module that uses the optical fiber component.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The preferred embodiments of the present invention will be explained in detail with reference to the accompanying drawings. In the explanations of the embodiments, the same reference numbers will be used for identical parts, and any redundant explanation will be omitted.

In the following, an optical fiber component of a first embodiment of the present invention will be explained with reference to the drawings.

Figure 1:
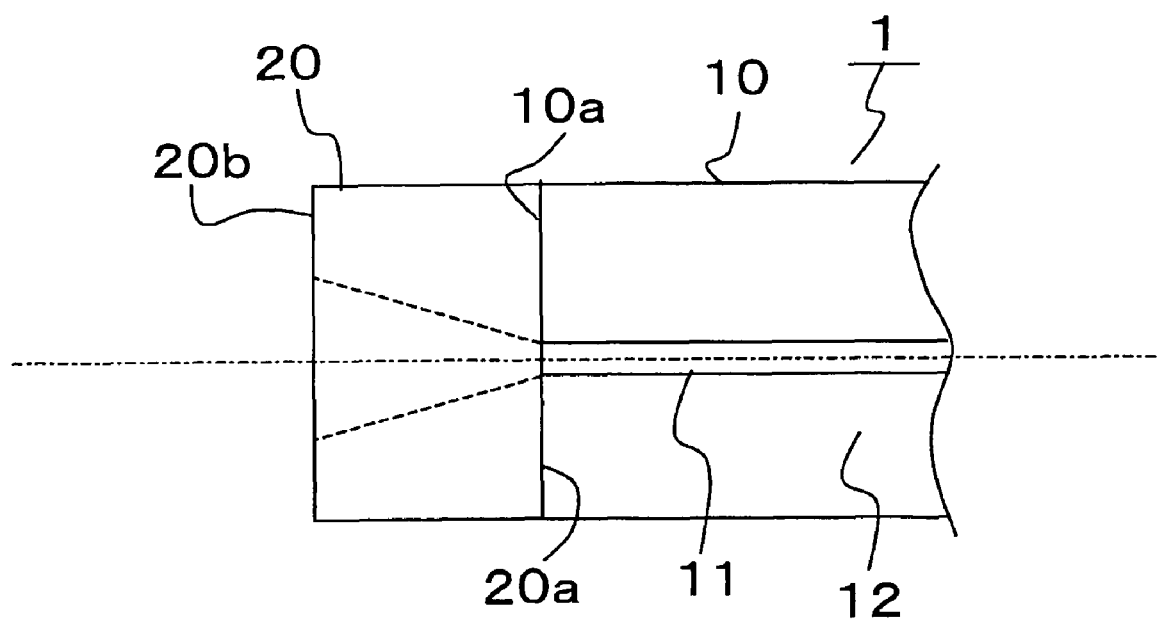
FIG. 1 is a schematic diagram illustrating an optical fiber component of a first embodiment of the invention.
Figure 2:
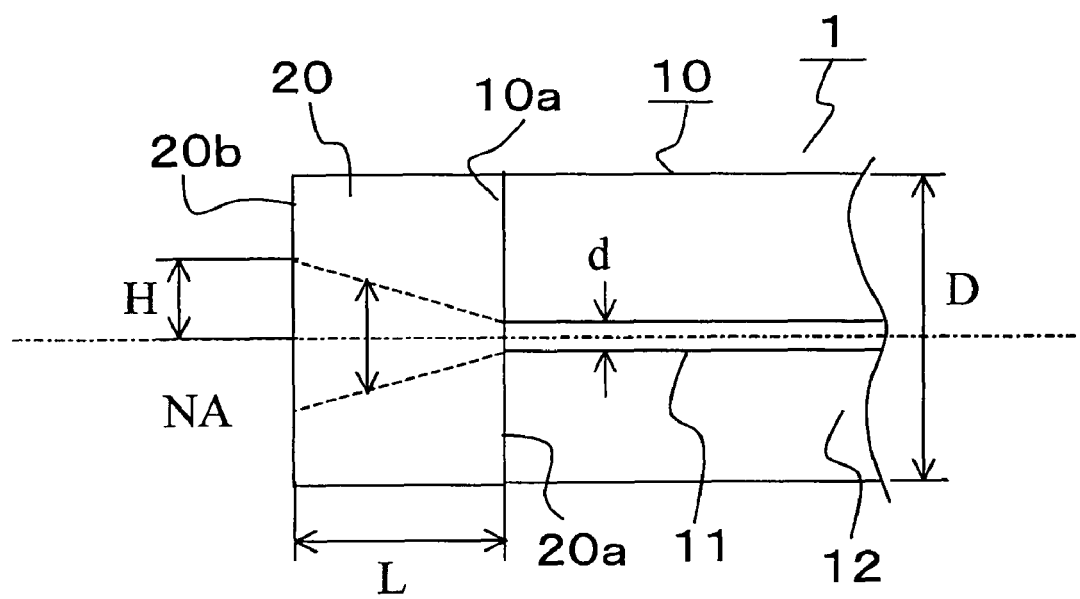
FIG. 2 is a diagram explaining the fundamentals of the optical fiber component illustrated in FIG. 1.

As illustrated in FIG. 1, this optical fiber component 1 comprises an optical fiber 10 through which light propagates, and a coreless fiber 20 that is connected to the end surface 10a of the optical fiber, and prevents foreign matter from adhering to this end surface 10a. The optical fiber 10 is a single-mode optical fiber comprising a core 11 and clad 12.

The optical fiber 10 and coreless fiber 20 are connected by fusing one end surface 20a of the coreless fiber 20 to the end surface 10 of the optical fiber 10. The coreless fiber 20 has the same diameter as the optical fiber 10 (for example, 125 μm), and has the same index of refraction as the clad 12 of the optical fiber 10.

The optical fiber 10 is an optical fiber for wavelengths not less than 375 nm and no greater than 650 nm. It is preferred that the optical fiber 10 be an optical fiber for wavelengths not less than 375 nm and no greater than 565 nm. It is even further preferred that the optical fiber 10 be an optical fiber for wavelengths not less than 375 nm and no greater than 488 nm.

Moreover, the optical fiber 10 is a single-mode optical fiber with the core 11 thereof being made from quartz ($SiO_2$), and the clad 12 being made from quartz ($SiO_2$) that is doped with fluorine (F).

In an optical fiber component 1 having this kind of construction, due to the two reasons described below, it is possible to suppress the adherence of compounds of comprising matter such as such as C, H and O that is included in minute amounts in the air to which the end surface of the optical fiber is exposed, to the core section of the end surface of the optical fiber (end surface of the core 11), or to the end surface of the coreless fiber 20.

(1) One end surface 20a of the coreless fiber 20 is fused with the end surface 10 of the optical fiber 10, so the core 11 section of the end surface 10a of the optical fiber 10 is no longer exposed to the air.

(2) When the outer diameter of the coreless fiber 20 is made the same as the outer diameter (fiber diameter) D of the optical fiber 10, by taking the length of the coreless fiber 20

(coreless fiber length) to be L, taking the distance from the center of the other end surface 20b of the coreless fiber 20 to be H (H=D/2), and taking the numerical aperture, which is the maximum angle of received light of the optical fiber to be NA, then the distance H is found from the following equation.

$$H = NA \times L$$

Moreover, in this optical fiber component, when light from a light source, for example laser light, enters from the side of the other end surface 20b of the coreless fiber 20 and is focused on the core 11 of the optical fiber 10, the beam area $S_H$ at the other end surface 20b of the coreless fiber 20 is given by the following equation.

$$S_H = \pi \times H^2$$

Also, the core area $S_d$ of the optical fiber at the end where there is no coreless fiber 20 is given by the following equation.

$$S_d = \pi \times (d/2)^2$$

Here, d is the core diameter of the optical fiber.

For example, when D=125 μm, the core diameter d of the optical fiber is 4 μm, NA=0.1 and L=0.3 mm, then H=NA× L=0.03 mm, so the beam area SH of the incident light becomes $S_H = 9 \times 10^{-4}$ πmm$^2$, and the core area $S_d$ of the optical fiber becomes $S_d = (0.002 \text{ mm})^2 \pi = 4 \times 10^{-6}$ πmm$^2$, such that the beam area $S_H$ is approximately 200 times the core area $S_d$ or greater.

In other words, the end surface 10a of the optical fiber 10, having a high incident light power density, is not directly exposed to the air. In addition, the end surface 20b of the coreless fiber 20 that is connected to the optical fiber 10 is directly exposed to the air, so the power density of the incident light here is greatly reduced to approximately 1/200th the power density of the incident light at the end surface 10a of the optical fiber 10 or less. As a result, it is possible to suppress the adherence of compounds of C, H and O that are included in minute amounts in the air to the end surface 10a of the optical fiber 10 and the end surface 20b of the coreless fiber 20.

Figure 8:
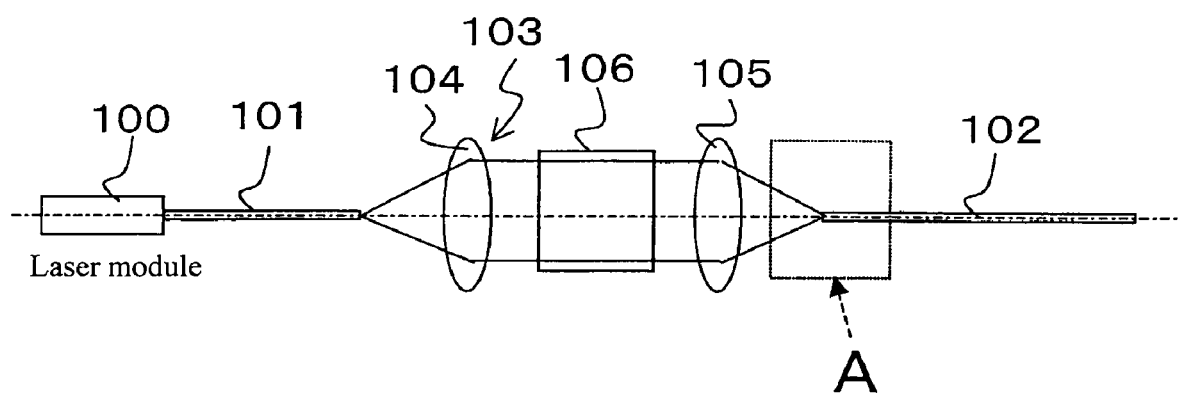
FIG. 8 is a schematic diagram illustrating a conventional optical module.
Figure 9:
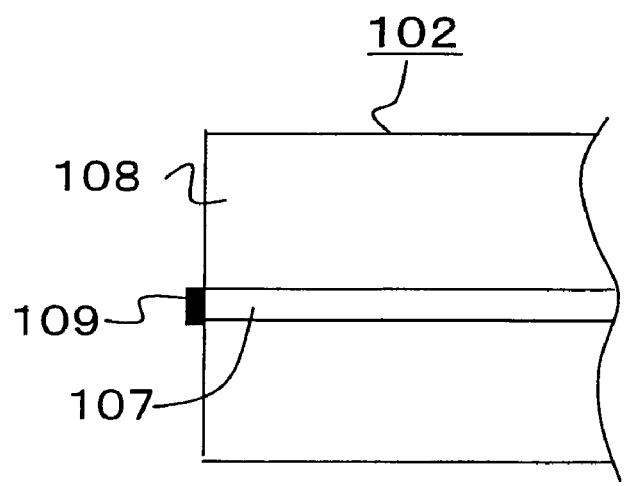
FIG. 9 is a diagram explaining compounds that adhere to the end surfaces of the optical fibers.

In an optical module as illustrated in FIG. 8, these compounds comprise C, H and O that are included in very minute amounts in the air to which the end surfaces of each optical fiber 101, 102 are exposed, so they particularly adhere to the core surface where light having a high power density is irradiated. That is, as illustrated in FIG. 9 of the enlarged section A of FIG. 8, C, H and O compounds 109 adhere to the end surface of the optical fiber 102 that comprises a core 107 and clad 108, and particularly to the core 107 section thereof. The thickness 't' of this compound 109 is about 100 nm, and the size is nearly the same as the core diameter of the optical fiber used (in this case, approximately 5 μm).

With the present invention, it is possible to suppress adherence of these kinds of compounds of C, H and O to the core of the optical fiber, so it is possible to obtain an long-life optical fiber component whose light propagation characteristics can be maintained over a long period of time.

When a typical optical fiber is used, NA is 0.1, the fiber diameter D is 125 μm and the core diameter d is 3 to 5 μm.

When this kind of typical optical fiber is used as the optical fiber 10, from experience it is found that the length L of the coreless fiber 20 becomes 0.3 mm or less, and that the beam area $S_H$ at the end surface 20b of the coreless fiber 20 is 150 times the core area $S_d$ or greater (the power density is 1/150th or less).

The coreless fiber length L is set within a range of not less than 0.1 mm and not greater than 0.3 mm. Preferably, the length L is set within a range of not less than 0.244 mm and not greater than 0.3 mm.

Next, an optical module that uses the optical fiber component illustrated in FIG. 1 will be explained based on FIG. 3.

Figure 3:
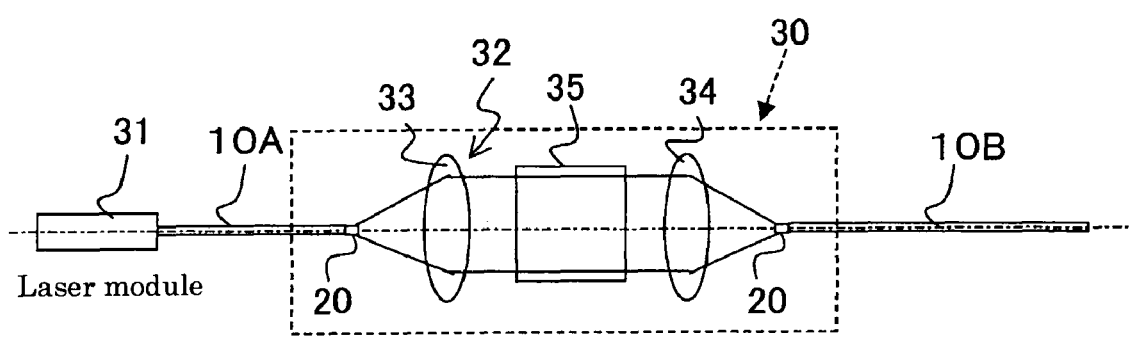
FIG. 3 is a schematic diagram of an optical module that uses the optical fiber component of the first embodiment.

The optical module 30 that is illustrated in FIG. 3 comprises: a laser module 31 that generates and outputs laser light, such as laser light having a wavelength between 375 μm and 650 μm, an optical fiber 10A and an optical fiber 10B on the output side on the input side that are connected to the laser module 31, a collimating system 32 that is located between the optical fibers 10A, 10B, and an optical function part 35 that is located between two collimating lenses (condenser lenses) of the collimating system 32. Here, the end surfaces of the optical fibers 10A, 10B may be arranged in airtight sealed portions inside the optical module 30, however, the advantages of the present invention can still be obtained even though the end sections are not sealed airtight.

The invention can be modified and embodied as described below.

Figure 4:
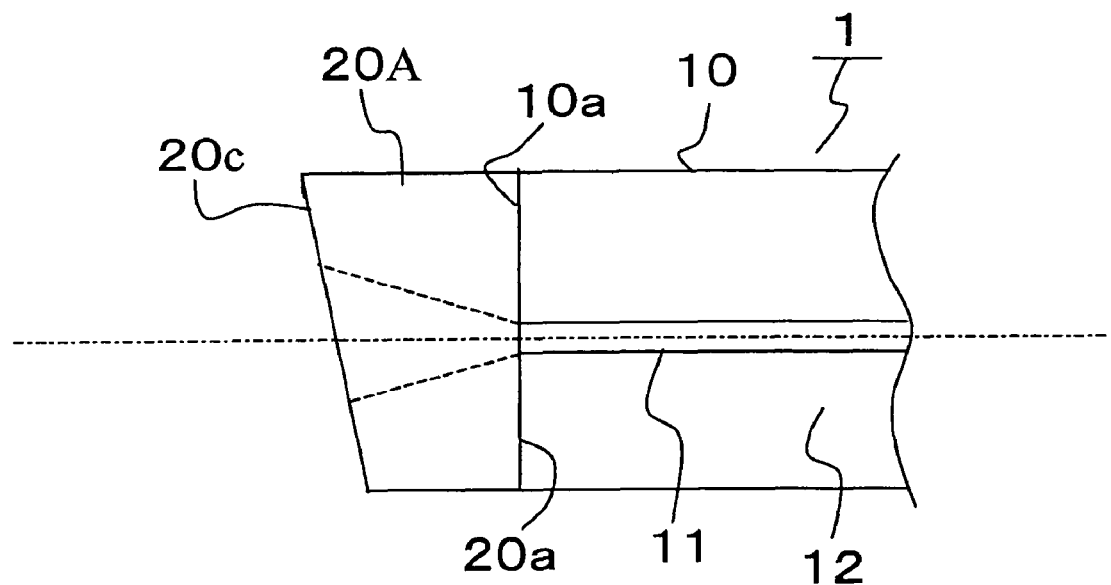
FIG. 4 is a schematic diagram illustrating a variation of the optical fiber component of the first embodiment.

In the optical fiber component illustrated in FIG. 1, a coreless fiber 20, one end surface 20a and other end surface 20b thereof being parallel, is used; however, as illustrated in FIG. 4, instead of this coreless fiber 20, a coreless fiber 20A can be used, whose other end surface 20c is an inclined surface that is inclined about 8°, for example, and prevents light from being reflected and returned.

Figure 5:
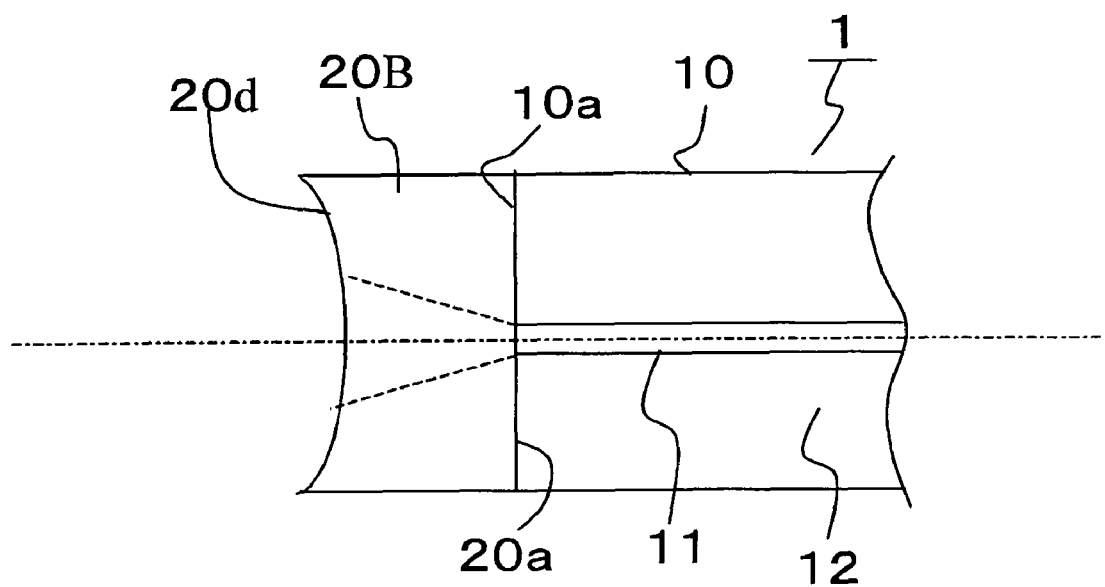
FIG. 5 is a schematic diagram illustrating another variation of the optical fiber component of the first embodiment.

Moreover, as illustrated in FIG. 5, instead of the coreless fiber 20 of the optical fiber 1 illustrated in FIG. 1, a coreless fiber 20B, whose other end surface is a concave curved surface 20d, can be used.

Furthermore, in the optical fiber component 1 that is illustrated in FIG. 1, the optical fiber 10 and coreless fiber 20 are connected such that one end surface 20a of the coreless fiber 20 is fused with the end section 10a of the optical fiber, however, the invention is not limited to an optical fiber component having this kind of construction.

For example, the present invention can also be applied to an optical fiber component in which the end surface of the optical fiber and one end surface of the coreless fiber are formed such that each is a convex shaped curved surface, and the optical fiber and coreless fiber are connected by fusing the apex of the one end surface of the coreless fiber with the core section, which is the apex of the end surface, of the optical fiber.

Moreover, the optical fiber component of the present invention can also be used in an optical module such as described in the embodiments above, and particularly an optical module, which uses passive parts as an optical function part 35 that is used in a laser module 31 that outputs light in the visible to ultraviolet range having a wavelength of approximately 600 nm or less, in the portion on the end surface where light that is output from a semiconductor laser and propagates through air enters the optical fiber.

Figure 6:
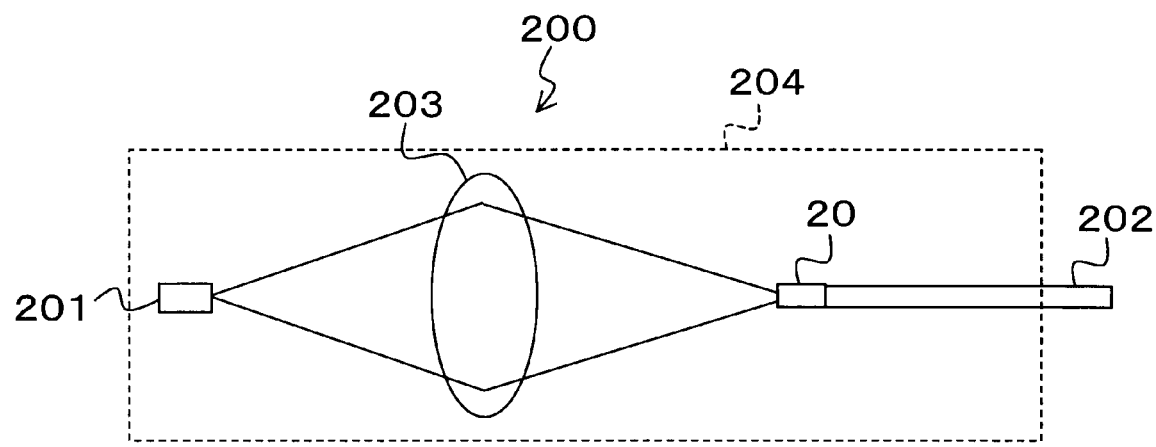
FIG. 6 is a schematic diagram illustrating an embodiment of a semiconductor laser module that uses the optical fiber component.

An embodiment of a semiconductor laser module that uses the optical fiber component of the present invention is illustrated in FIG. 6. The semiconductor laser module 200 comprises: a semiconductor laser 201 that outputs visible light having a wavelength of 600 nm or less, a lens 203, an optical fiber 202, a coreless fiber 20 that is connected to the optical fiber 202, and a package 204 that seals at least the semiconductor laser 201 such that it is airtight.

The semiconductor laser emits light by applying a specified electric current, and the output laser light is focused on the end surface of optical fiber 202 by the lens 203 and is optically coupled with the core of the optical fiber 202. When this happens, the coreless fiber 20 is connected to the end surface of the optical fiber 202 by a method described in the embodiment above, such as by fusing, and because the core surface of the optical fiber having high light density is not directly exposed to the air, compounds of C, H and O do not accumulate. Moreover, the end surface of the coreless fiber 20 that is connected to the optical fiber 202 is directly exposed to the air, however, the power density of the input light there is greatly reduced to nearly 1/200th or less that of the power density of the light that is input at the end surface of the optical fiber 202. As a result, it is possible to suppress the adherence of compounds of C, H and O that are included in minute amounts in the air to the end surface of the optical fiber 202 and the end surface of the coreless fiber 20.

Figure 7:
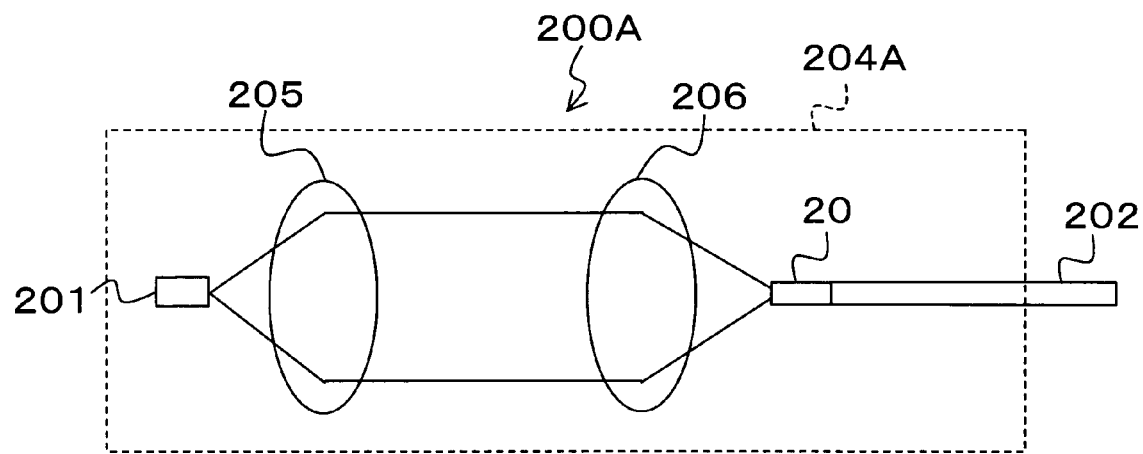
FIG. 7 is a schematic diagram illustrating another embodiment of a semiconductor laser module that uses the optical fiber component.

Furthermore, FIG. 7 illustrates another embodiment of a semiconductor laser module that uses the optical fiber component of the present invention.

The semiconductor laser module 200A that is illustrated in FIG. 7 comprises: a semiconductor laser 201 that outputs visible light having a wavelength of 600 nm or less, two collimating lenses (condenser lenses) 205, 206, an optical fiber 202, a coreless fiber 20 that is connected to the optical fiber 202, and a package 204A that seals at least the semiconductor laser 201 so that it is airtight.

In this semiconductor laser module 200A as well, as in the case of the semiconductor laser module 200 described above, it is possible to suppress the adherence of compounds of C, H and O that are included in minute amounts in the air to the end surface of the optical fiber 202 and the end surface of the coreless fiber 20.

Although the invention has been described with respect to specific embodiments for a complete and clear disclosure, the appended claims are not to be thus limited, but are to be construed as embodying all modifications and alternative construction that may occur to one skilled in the art that fairly fall within the basic teaching herein set forth.

What is claimed is:

1. An optical fiber component, comprising:
   an optical fiber that transmits light; and
   a coreless fiber that is connected to an end surface of said optical fiber and prevents foreign matter from adhering to the end surface of said optical fiber,
   wherein the end surface of said optical fiber and one end surface of said coreless fiber are formed such that they are convex shaped curved surfaces, and said optical fiber and said coreless fiber are connected together at an apex of the one end surface of said coreless fiber with a core section, which is an apex, of the end surface of said optical fiber.

2. The optical fiber component according to claim 1, wherein said optical fiber is an optical fiber for wavelengths no less than 375 nm and no greater than 650 nm.

3. The optical fiber component according to claim 1, wherein said optical fiber is an optical fiber for wavelengths no less than 375 nm and no greater than 565 nm.

4. The optical fiber component according to claim 1, wherein said optical fiber is an optical fiber for wavelengths no less than 375 nm and no greater than 488 nm.

5. The optical fiber component according to claim 1, wherein said optical fiber is a single-mode optical fiber having a quartz ($SiO_2$) core and a quartz ($SiO_2$) clad that is doped with fluorine (F).

6. The optical fiber component according to claim 1, wherein another end surface of said coreless fiber is an inclined surface for preventing light from reflecting and returning.

7. An optical module that uses the optical fiber according to claim 1, having one or more optical systems, comprising:
   said optical fiber component that is located on an input side;
   another optical fiber component that is located on an output side;
   a collimating optical system that is located between said optical fiber component on the input side, and said other optical fiber component on the output side; and
   an optical function component that is located between two condenser lenses of said collimating system.

8. A semiconductor laser module comprising:
   the optical fiber component according to claim 1, which is optically coupled to an end surface of a fiber into which light that is output from a semiconductor laser is input.

* * * * *